United States Patent [19]

Akutsu

[11] Patent Number: 4,835,533

[45] Date of Patent: May 30, 1989

[54] VEHICLE-USE LOCKING AND UNLOCKING SYSTEM

[75] Inventor: Shouji Akutsu, Tokyo, Japan

[73] Assignee: Kokusan Kinzoku Kogyo Kabushiki Kaisha, Tokyo, Japan

[21] Appl. No.: 850,176

[22] Filed: Apr. 10, 1986

[30] Foreign Application Priority Data

Oct. 28, 1985 [JP] Japan ............................... 60-239525

[51] Int. Cl.⁴ ............................................... G06F 7/04

[52] U.S. Cl. ......... 340/825.31; 340/825.32; 340/430; 70/256; 180/287; 307/10.5

[58] Field of Search ........... 340/825.3, 825.31, 825.32, 340/825.62, 825.69, 825.54, 528, 542, 520, 56, 63, 52 R, 825.34, 825.72; 70/257, 256, 278; 180/287; 307/10 AT

[56] References Cited

U.S. PATENT DOCUMENTS

| | | | |
|---|---|---|---|
| 3,760,422 | 9/1973 | Zimmer et al. | 340/825.69 |
| 3,891,980 | 6/1975 | Lewis et al. | 340/572 |
| 3,906,348 | 9/1975 | Willmott | 340/825.69 |
| 4,137,985 | 2/1979 | Winchell | 70/252 |
| 4,205,325 | 5/1980 | Haygood et al. | 340/63 |
| 4,240,516 | 12/1980 | Henderson et al. | 307/10 AT |
| 4,353,064 | 10/1982 | Stamm | 340/825.69 |
| 4,486,806 | 12/1984 | Mochida et al. | 307/10 AT |
| 4,509,093 | 4/1985 | Stellberger | 340/825.31 |
| 4,670,746 | 6/1987 | Taniguchi et al. | 340/825.31 |
| 4,672,375 | 6/1987 | Mochida et al. | 340/825.31 |
| 4,688,036 | 8/1987 | Hirano et al. | 340/825.31 |
| 4,700,186 | 10/1987 | Fujino et al. | 340/825.72 |
| 4,719,460 | 1/1988 | Takeuchi et al. | 340/825.31 |

FOREIGN PATENT DOCUMENTS

| | | | |
|---|---|---|---|
| 2514306 | 4/1983 | France | 70/256 |

*Primary Examiner*—John W. Caldwell, Sr.
*Assistant Examiner*—Edwin C. Holloway, III
*Attorney, Agent, or Firm*—Fleit, Jacobson, Cohn & Price

[57] ABSTRACT

The invention relates to a vehicle use, wireless signal controlled locking and unlocking system. This system includes a user-carriable, userside controller and a vehicle side controller. The former controller takes the form of a card. Both these controllers are mutually communicatable by way of wireless communication and adapted for control of door-locking and unlocking operations. Switches are provided at the vehicle outside door handle and trunk, while a buzzer and a timer are provided within the vehicle interior. The buzzer is operated for a predetermined short time period, for instance 5 seconds, when the door has been brought to its locked position under such a condition that when the userside controller had been left in the vehicle with carelessness. In this case, however, the door can be opened by simple manipulation of the handle switch so far as the buzzer is kept in operation.

1 Claim, 2 Drawing Sheets

VEHICLE-USE LOCKING AND UNLOCKING SYSTEM

BACKGROUND OF THE INVENTION

1. Field of the Invention

This invention relates to improvements in and relating to vehicle use, wireless signal controlled locking and unlocking systems, comprising a userside controller and a vehicle side controller. Both these controllers are mutually communicatable for locking and unlocking of vehicle door(s).

2. Description of the Prior Art

It has already been proposed to design and arrange the above kind system to provide a userside controller which is personally carriable by the user to operate switch means provided at the vehicle outside door handle or the like part(s). The userside controller is communicatable with the vehicle's interior controller through wireless signals. The door can be brought into unlocked position when there is a coincidence between the code signal preset in the vehicle said controller and that to be delivered from the userside controller.

Practical experience has shown with use of such conventional door-locking and unlocking system, such a inconvenience and a drawback when the door has been locked with the user-carriable, userside controller left alone in the vehicle interior, there may be such a dangerous accident which causes the unlocking of the door by simply manipulating the door handle- or similar switch means from outside the vehicle and by any unauthorized third person.

SUMMARY OF THE INVENTION

It is a main object of the invention to obviate such conventional theft inconvenience and by use of simpler protecting means and arrangement.

By the present invention it is proposed to provide a vehicle use, wireless signal controlled locking and unlocking system, comprising a user-carriable, userside controller and a vehicle side controller, these controllers being mutually communicatable by means of wireless communication and adapted for control of door-locking and -unlocking operations, said system characterized by switch means which are provided at the vehicle outside door handle, while a buzzer and a timer are provided within the vehicle interior, said buzzer is operated for a predetermined short period when the door has been brought to its locked position while the userside controller had been left in the vehicle interior, said door can be opened by simple manipulation of said handle switch as long as the buzzer remains in operation.

Further objects, features and advantages of the invention will become more apparent when reading the following detailed description of the invention with reference to the accompanying drawings, in which:

DETAILED DESCRIPTION OF A PREFERRED EMBODIMENT OF THE INVENTION

In the following, a preferred embodiment of the invention will be described with reference to the accompanying drawings.

Figure 1:
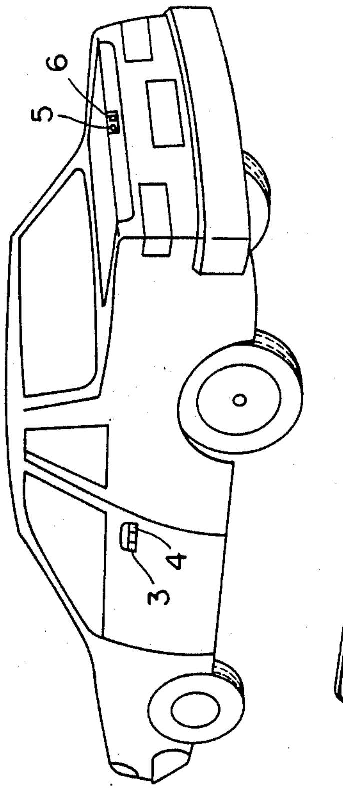
FIG. 1 is a schematic and perspective view of a vehicle provided with the inventive system.
Figure 1A:
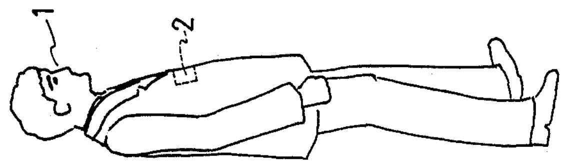
Figure 1B:
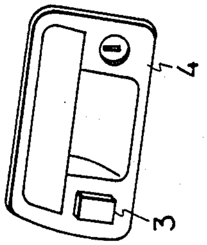
Figure 1C:
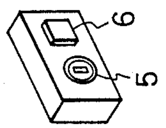

In FIG. 1, numeral 1 represents schematically an authorized person, briefly referred to as "user" hereinafter. He carries personally a userside controller 2 which will be more fully described later with reference to FIG. 2.

Numeral 3 represents a handle switch mounted on a conventional door handle 4, the latter being fitted on an openable and reclosable door 101 of the automotive vehicle 100 and in the manner, as conventionally personally operable from outside of the vehicle.

Numeral 102 represents the conventional trunk lid of the vehicle 100, which is naturally openable and reclosable and fitted as in the conventional with a trunk key cylinder unit 5 carrying a trunk switch 6.

Figure 2:
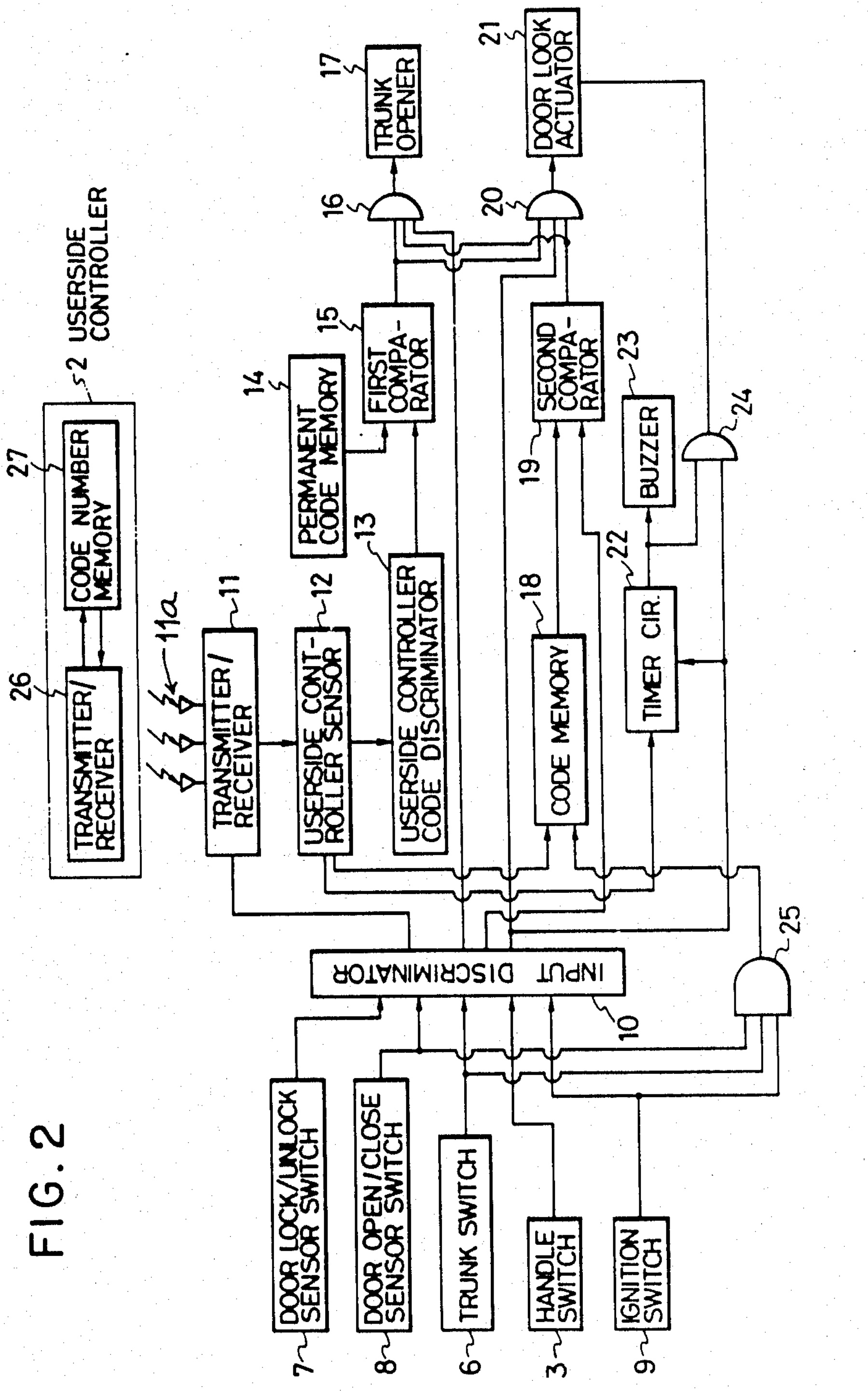
FIG. 2 is a schematic block diagram of the inventive system.

Now turning to FIG. 2, said switches 3 and 6 are shown in blocks.

Numeral 7 represented in a block represents a door lock/unlock sensor which delivers a high voltage level signal when the door 101 is locked and kept locked.

Numeral 8 represents a door open/close sensing sensor which delivers a high voltage level signal when the door 101 is opened and kept opened.

Numeral 9 represents a conventional ignition switch which delivers a high voltage level signal when the engine ignition key, not shown, is brought from outside into position and turned clockwise to a certain angular position.

Numeral 10 represents an input discrimination which is adapted to deliver its outputs to several related circuits to be described when all the switches 3, 6–9 are sensed thereat of their respectively closed positions.

Numeral 11 represents a vehicle side receiver/transmitter circuit which is adapted for receiving wireless signals from three antennas 11*a* positioned selectively remote positions in and on the vehicle 100, preferably and, as an example, in the interior of the vehicle back mirror, below the auxiliary driver's seat and within the interior space of the vehicle trunk, or reversely for transmitting a wireless signal through said three antennas 11*a* to receiver/transmitter circuit 26 contained in userside controller 2.

Numeral 12 represents a userside controller sensor circuit adapted to deliver output signal upon reception of the signal at antenna 11*a* from the userside controller 2, as will be described later more fully.

Numeral 13 represents a userside controller code number discriminator which is adapted for discriminating a specifically designed code number allocated to userside controller 2 by read-out of the transmitted signal from the latter.

Numeral 14 represents a memory circuit which reserves a specifically designed vehicle code number already at the manufacturing stage of the vehicle.

Numeral 15 represents a first comparator circuit which delivers an output when there is a coincidence between outputs from userside controller code number discriminator 13 and those from the memory 14.

Numeral 16 represents AND-circuit receiving, as its inputs, the output from first comparator 15; the output from second comparator 19 to be described and the output from trunk switch 6 through discriminator 10.

Numeral 17 represents a trunk opener which is brought into its unlocking position upon reception of output from AND-circuit 16.

Numeral 18 represents a code number memory circuit adapted for memory of the number of pulse signals delivered from AND-circuit 25 to be described and under such condition that the userside controller sensor circuit 12 is sensing of the userside controller 2.

Numeral 19 represents a second comparator circuit adapted for making comparison between the signal delivered from the memory 18 and the pulse number obtainable when handle switch 3 or trunk switch 6 is operated and for issuing an output when there is coincidence upon performing the said comparison job.

Numeral 20 represents AND-gate receiving as its inputs the outputs from said comparator 19, and outputs from first comparator 15 as well as handle switch 3 through discriminator 10.

Numeral 21 represents a door lock actuator which is brought to the unlock position upon reception of the output from the last mentioned AND-circuit.

Numeral 22 represents a timer circuit adapted for delivery of an output for a predetermined time period such as 5 seconds upon reception of the outputs from the both circuits 10 and 12.

Numeral 23 represents a buzzer adapted for delivery of audio alarm signal upon reception of the output from the timer 22.

Numeral 24 represents AND-circuit adapted to receive as its inputs the respective outputs from said switches 3; 8 and 9.

Numeral 25 represents further AND-circuit adapted for reception, as its inputs, the outputs from circuit 10 and 22.

Numeral 26 represents a combined transmitter/receiver unit which is fitted at the userside controller 2 and adapted for establishing wireless communication with said vehicle side combined transmitter/receiver circuit 11.

In the following, the operation will be set forth more in detail.

First, when opening jobs for the vehicle door and the trunk lid are described, a signal (code signal) corresponding to a specifically selected pulse pattern peculiar to the user is delivered by manipulation of handle switch 3 or trunk switch 6. The required opening job can not be brought about if there is no coincidence between the above sent-out code signal and the already registered code signal by the user. This registration job can be executed by manipulation of the handle switch 3 as follows:

More specifically, the door is opened, the ignition switch 9 is made on and further, the handle switch 3 is made on for a predetermined short period, such as preferably for 5 seconds. Then, an output will be delivered from input adjudging circuit 10 to timer circuit 22 so that buzzer 23 is caused to operate.

At this stage, the user 1 on/off- operates manually the handle switch 3 in a specifically selected mode representing any preferredly varied time intervals, thereby the on-periods-continuing pulses being delivered to AND-circuit 25 to code signal memory circuit 18 for storing therein. Then, the code signal memorial registration job will be terminated upon lapse of a predetermined off period, for instance, preferably 5 seconds, of the handle switch 3. In this way, the preselected code signal will be preserved at the code signal memory circuit 18.

Now, the opening operation relative to the door or trunk of the vehicle, after the code signal of the above kind has been already registered in the manner as has been mentioned hereinabove, will be illustrated:

Now, assuming that the user 1 personally carrying the userside controller 2 approaches the vehicle, a signal specifically preset at the vehicle manufacturer's factory will be delivered from the userside controller 2 through combined transmitter/receiver circuit 26. This transmitted signal is received wirelessly by the combined transmitter/receiver circuit 11 at the vehicle side and forwarded through the circuit 12 to the discriminator 13 for the execution of the desired code number discrimination job. Further, a comparison job is performed between the output from discriminator 13 and the output from the permanent code number memory 14, and at the first comparator 15. When there is a coincidence thereat, an output therefrom will be fed to one of inputs of AND-circuit 16. At this stage, an output will be fed from userside controller sensor 12 to the timer 22, thereby buzzer 23 being caused to operate so as to demonstrate that the related circuits are effective. At the same time, an output is delivered to the memory circuit 18 which is caused to operate thereby. Therefore, the code number which has been registered by the user himself will be fed to another input of the second comparator 19.

Under these conditions, the user 1 will operate the handle switch 3 or trunk switch 6 so as to feed the code number signal which has been already preset and registered by the user himself through switches 3; 6 as outputs. The thus input pulse pattern signal will be fed to input discriminator circuit 10, thence to another input terminal of second comparator 19. When there is a coincidence between the thus input code signals, second comparator 19 will deliver an output signal to AND-circuit 16. Thus, when the user operates trunk switch 6, trunk opener 17 will be brought to operate so as to open the trunk lid, since an output signal showing that the user has operated trunk switch 6 has already been delivered from input discriminator 10. In the similar manner, when the user has operated handle switch 3, since a signal showing that the user has already manipulated the handle switch 3 is delivered from the same circuit 10, door lock actuator 21 is caused to operate so as to open the door.

Next, an operation mode when the user has left his user side controller 2 in the vehicle interior and he has already locked the door, will be illustrated hereinbelow:

Now, when the door has been locked, an output will be delivered from the door lock/unlock sensor switch 7 and timer circuit 22 is caused to operate, so as to energize the alarm buzzer 23 which is thus energized for a predetermined short time period such as preferably 5 seconds.

During this buzzer operation and when the use makes once the handle switch 3 on, output from timer circuit 22 and output from input discriminator circuit 10 are fed to the respective inputs of AND-circuit 24 which will deliver an output, thereby door lock actuator 21 being caused to operate for opening the door.

Next, if the use does not operate the handle switch 3 on during the operation period, for instance 5 seconds, of buzzer 21, the latter will become off upon lapse of the predetermined buzzer operation period. Thus, the door is kept at its locked position. When it is desired to unlock the door under these operational conditions, it is enough for this purpose to input, by manipulation of the handle switch 3, the registered code signal in form of a pulse series pattern signal. More specifically, since the userside controller's code number descriminator or sensor circuit 13 has already sensed the very near existence of userside controller 2 and the first comparator 16 has already delivered an output while the code number signal has already been input by the manipulation of handle switch 3, and thus, the second comparator 19 has already delivered an output, the door lock actuator is caused to actuate for unlocking the door.

Next, assuming that the similar condition where the userside controller 2 has been left in the vehicle interior and nevertheless the trunk lid has been locked, the trunk can be opened in the similar way as was described above of the case where the locked door has been opened in the similar way.

It should be mentioned, however, that if the aforementioned code signal registration job has not yet been carried into effect, the door lock actuator 21 will be caused to operate and thus, the door could not be locked under these conditions.

Thus, it will be seen if the userside controller 2 has been left in the vehicle interior, it is impossible to lock the door.

As for the handle switch 3, it may take the form of a push button switch or a pull-up switch, as it may be desired.

What is claimed is:

1. A wireless signal controlled locking and unlocking system comprising:

a user-carriable user-side controller having memory means for storing a factory-set predetermined code number and a first communication means for communicating said factory-set predetermined code number, said user-carriable, user-side controller being transportable;

a vehicle side controller including:

vehicle side communication means for receiving said factory-set predetermined code number from said first communication means;

vehicle code memory means for storing a vehicle code member;

sensor means for sensing a locked or unlocked position of a lock, said sensor means providing a signal representing said locked position;

handle switch means for manually providing a pulse series pattern signal;

a user code memory for storing a manually entered user code number signal generated by said handle switch means;

a first comparator for comparing the received factory-set predetermined code number with said vehicle code number and outputting a first signal upon coincidence;

a second comparator for comparing said user code number signal with said pulse series pattern and outputting a second signal upon coincidence;

a timer means for generating and outputting an energizing signal for a predetermined time period upon initial receipt of said signal from said sensor means;

buzzer means for receiving said energizing signal from said timer means and outputting an audible sound for said predetermined time period; and actuator means for unlocking the system during receipt of said energizing signal from said timer means and upon actuation of said handle switch means so that when said user-carriable user-side controller is left in the vehicle, the system is unlocked during said predetermined time period and for unlocking the system upon receipt of said first signal from said first comparator and said second signal from said second comparator.

* * * * *